United States Patent [19]
Ochi et al.

[11] Patent Number: 5,334,661
[45] Date of Patent: Aug. 2, 1994

[54] EPOXY RESIN REACTED WITH PHENOLIC OH-ARAMIDE/BAN

[75] Inventors: Mitsukazu Ochi, 1-5, Minami Kasugaoka 7-chome, Ibaraki-shi, Osaka, Japan; Toshio Tagami; Osamu Kiyohara, both of Shizuoka, Japan

[73] Assignees: Tomoegawa Paper Co., Ltd., Tokyo; Mitsukazu Ochi, Osaka, both of Japan

[21] Appl. No.: 97,890

[22] Filed: Jul. 28, 1993

Related U.S. Application Data

[62] Division of Ser. No. 851,801, Mar. 16, 1992, Pat. No. 5,258,456.

[30] Foreign Application Priority Data

| | | |
|---|---|---|
| Mar. 15, 1991 [JP] | Japan | 3-74419 |
| Apr. 11, 1991 [JP] | Japan | 3-105058 |
| Apr. 11, 1991 [JP] | Japan | 3-105165 |
| Apr. 12, 1991 [JP] | Japan | 3-106414 |
| Apr. 12, 1991 [JP] | Japan | 3-106415 |
| Apr. 19, 1991 [JP] | Japan | 3-113648 |
| Apr. 30, 1991 [JP] | Japan | 3-124446 |
| May 1, 1991 [JP] | Japan | 3-126441 |
| May 8, 1991 [JP] | Japan | 3-131617 |
| May 9, 1991 [JP] | Japan | 3-132117 |
| May 14, 1991 [JP] | Japan | 3-136919 |
| May 15, 1991 [JP] | Japan | 3-138626 |
| May 15, 1991 [JP] | Japan | 3-138650 |
| May 21, 1991 [JP] | Japan | 3-144065 |
| May 22, 1991 [JP] | Japan | 3-145240 |
| Dec. 26, 1991 [JP] | Japan | 3-356750 |

[51] Int. Cl.$^5$ ............ C08L 63/02; C08L 63/04
[52] U.S. Cl. .................... 525/90; 428/209; 428/408; 428/418; 523/436
[58] Field of Search ............................ 525/90

[56] References Cited

U.S. PATENT DOCUMENTS

5,189,101  2/1993  Burlett et al. ............... 525/90

FOREIGN PATENT DOCUMENTS

60-1255  1/1985  Japan.

OTHER PUBLICATIONS

Derwent Abstract No. 83-18783K/08 of Japanese Patent No. 58-7426 to Japan Synthetic Rubber, published Jan. 17, 1983.

*Primary Examiner*—Robert E. Sellers
*Attorney, Agent, or Firm*—Cushman, Darby & Cushman

[57] ABSTRACT

An epoxy resin modified material is disclosed, which is obtained by reacting an epoxy resin and a phenolic hydroxyl group-containing aramid/polybutadiene-acrylonitrile block copolymer represented by formula (I):

$$-[C-(CH_2-CH=CH-CH_2)_x-CH(CN)-CH_2)_y]_z-C(O)-NH-Ar^1-NH-[C(O)-Ar^1-C(O)-NH-Ar^2-NH]_m-[C(O)-Ar^2-C(O)-NH-Ar^3-NH]_n-]_l$$

wherein $Ar^1$ and $Ar^3$ each represent a divalent aromatic group; $Ar^2$ represents a phenolic hydroxyl group-containing divalent aromatic group; x represents an integer of from 3 to 7; y represents an integer of from 1 to 4; y/(x+y) is from 0.1 to 0.3; z represents an integer of from 5 to 15; m represents an integer of from 1 to 400; n represents an integer of from 1 to 400; n/(m+n) is from 0.01 to 0.50; and l represents an integer of from 1 to 50. An epoxy resin composition containing the epoxy resin modified material is useful as a cationic electrodeposition coating.

6 Claims, No Drawings

EPOXY RESIN REACTED WITH PHENOLIC OH-ARAMIDE/BAN

This is a division of application Ser. No. 07/851,801, filed Mar. 16, 1992, now U.S. Pat. No. 5,258,456.

FIELD OF THE INVENTION

This invention relates to an epoxy resin modified material and an epoxy resin composition containing the same and exhibiting improved toughness.

BACKGROUND OF THE INVENTION

Modifications of epoxy resins have been widely studied in an attempt to broaden their application. Although epoxy resins are excellent in electrical characteristics, adhesion, and thermal characteristics, they are generally brittle and liable to suffer from cracking due to stress-strain, heat or dynamic impact on curing or use. In order to offset these disadvantages and to endow epoxy resins with toughness, use of a hardener having a long chain aliphatic group or rubbery properties, addition of a compound having elastomeric properties, addition of a plasticizer, e.g., asphalt substances and glycols, addition of reinforcing fibers, e.g., glass fiber, aramid fiber and carbon fiber, and introduction to an epoxy compound a molecular group exhibiting rubber elasticity have been proposed as disclosed in Mitsukazu Ochi, KOBUNSHI, Vol. 38, No. 3, p. 200 (1989).

However, these modificaitons failed to obtain sufficient effects because an epoxy resin and some modifiers added are not sufficiently compatible with each other, or some modifications impair excellent characteristics of epoxy resins, such as heat resistance and adhesion, or some modified epoxy resins are not suitable for practical use because of greatly increased cost.

SUMMARY OF THE INVENTION

In order to overcome the above-described problems, the inventors have conducted extensive investigations and, as a result, found that an epoxy resin modified material obtained by reacting an epoxy resin with a phenolic hydroxyl group-containing aramid/-polybutadiene-acrylonitrile block copolymer endows an epoxy resin with improved toughness without impairing excellent characteristics of the epoxy resin. The present invention has been completed based on this finding.

The present invention relates to an epoxy resin modified material obtained by reacting an epoxy resin and a phenolic hydroxyl-containing aramid/polybutadiene-acrylonitrile block copolymer represented by formula (I):

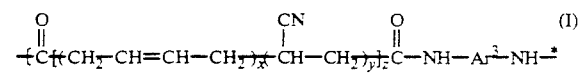
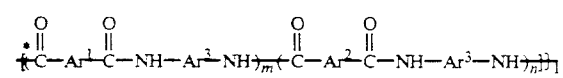

wherein $Ar^1$ and $Ar^3$ each represent a divalent aromatic group; $Ar^2$ represents a phenolic hydroxyl group-containing divalent aromatic group; x represents an integer of from 3 to 7; y represents an integer of from 1 to 4; $y/(x+y)$ is from 0.1 to 0.3; z represents an integer of from 5 to 15; m represents an integer of from 1 to 400; n represents an integer of from 1 to 400; $n/(m+n)$ is from 0.01 to 0.50; and l represents an integer of from 1 to 50.

The present invention also relates to an epoxy resin composition comprising (A) the above-described epoxy resin modified material, (B) an epoxy resin, and (C) a hardener.

DETAILED DESCRIPTION OF THE INVENTION

Epoxy resins which can be used in the preparation of the epoxy resin modified material of the present invention include, for example, the following resins (A) to (D).

(A) Bisphenol type epoxy resins represented by formula (II):

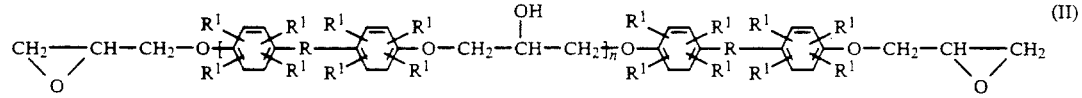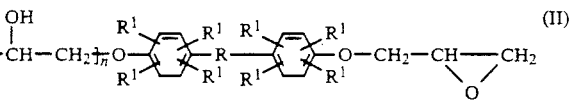

wherein R represents —C(CH$_3$)$_2$—, —CH(CH$_3$)—, —CH$_2$—, or —SO$_2$—; R$^1$ represents a hydrogen atom, a bromine atom, or a methyl group; and n represents an integer of from 0 to 70.

While the degree of polymerization n in formula (II) is not particularly limited, an average of n preferably ranges from 0 to about 0.3 from the standpoint of easy handling, availability on the market, and cost.

The bisphenol type epoxy resins (II) include bisphenol A types, bisphenol F types, bisphenol AID types, and bisphenol S types, and halides thereof (e.g., bromides and chlorides). These bisphenol type epoxy resins may be used either individually or in combination thereof.

(B) Novolak type epoxy resins represented by formula (III):

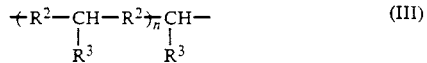

wherein R$^2$ represents a group of formula (IV):

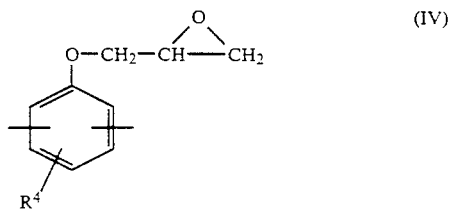

or a group of formula (V):

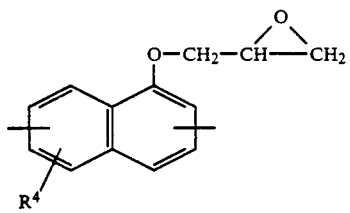

(V)

wherein R⁴ represents a hydrogen atom, a bromine atom, or a methyl group; $R^3$ represents —(CH$_2$)$_3$CH$_3$—, —CH$_2$CH(CH$_3$)$_2$, —C(CH$_3$)$_2$CH$_2$CH$_3$, —CH=CH$_2$, —CH$_6$H$_6$ or a hydrogen atom; and n represents an integer of from 1 to 40.

The novolak type epoxy resins (III) include o-cresol novolak types, phenolic novolak types, and naphthol novolak types, and methylation or bromination products thereof. These novolak type epoxy resins may be used either individually or in combinations thereof.

(C) Cyclic Aliphatic Epoxy Resins

Cyclic aliphatic epoxy resins include alicyclic diepoxy acetal, alicyclic diepoxy adipate, and alicyclic diepoxy carboxylate. Allcyclic epoxy resins of various grades are easily available on the market. These allcyclic epoxy resins may be used either individually or in combinations thereof(D)

Glycidylamine-Based Epoxy Resins

Glycidylamine-based epoxy resins include tetraglycidyldiaminobenzidine, tetraglycidyldiaminodiphenylmethane, tetraglycidyldiaminodiphenyl ether, tetraglycidyldiaminodiphenylsulfone, tetraglycidyldiaminodiphenyl-2,2′-propane, 1,4-bis(p-diglycidylaminophenoxy)benzene, 2,2-bis(p-diglycidylaminophenoxyphenyl)propane, bis(p-diglycidylaminophenoxyphenyl)sulfone, triglycidyl-p-aminophenol, triglycidyl-m-aminophenol, tetraglycidylbisaminomethylcyclohexane, diglycidylaminonaphthol, and methylation or bromination products thereof. These glycidylamine-based epoxy resins may be used either individually or in combinations thereof.

(E) Glycidyl Ester-Based Epoxy Resins

Glycidyl ester-based epoxy resins include diglycidyl phthalate, diglycidyl hexahydrophthalate, diglycidyl tetrahydrophthalate, and methyl glycidyl esters. These glycidyl ester-based epoxy resins may be used either individually or in combinations thereof.

(F) Naphthalene Type Epoxy Resins

The epoxy resin modified material according to the present invention can be obtained by reacting the above-mentioned epoxy resin and a block copolymer of formula (I) in a solvent, such as amide solvents, e.g., N,N-dimethylacetamide and N-methyl-2-pyrrolidone, and ether solvents, e.g., tetrahydrofuran. The epoxy resin is used in an amount usually of from 1 to 20 times, preferably from 5 to 15 times, the amount of the block copolymer (I). The reaction is carried out at a temperature of 50° C. or higher, and preferably 70° C. or higher.

In the epoxy resin composition according to the present invention, the block copolymer (I) is preferably present in an amount of from 0.1 to 15% by weight based on the total epoxy resin.

While the mechanism of the block copolymer (I) in bringing about an improvement in toughness of an epoxy resin has not yet been elucidated, the folloiwng assumption can be made. The hydroxyl group of the copolymer (I) is reacted with an epoxy resin to provide an epoxy resin modified material having improved compatibility with an epoxy resin, which comprises the epoxy component having uniformly dispersed therein the aramid component on the molecular level. When the epoxy resin modified material is hardened by heating, the polybutadiene-acrylonitrile component undergoes micro-phase separation, and the aramid component is fixed as dispersed in the epoxy component on the molecular level. Thus, the aramid chains having excellent rigidity and a high glass transition temperature are dispersed in the epoxy resin on the molecular level, whereby heat resistance and toughness of the epoxy resin are improved and also the uniformly dispersed polybutadiene-acrylonitrile component functions to relax the stress, leading to effective improvement of toughness of the epoxy resin hardened product without reducing heat resistance.

Such a toughness improving effect can be achieved by addition of a small amount of the copolymer. As a result, heat resistance of the resulting epoxy resin composition and its hardened product can be improved without impairing the excellent characteristics inherent thereto.

The block copolymer (I) can be synthesized as follows. A dicarboxylic acid having Ar² (a phenolic hydroxyl group-containing divalent aromatic group in formula (I)), a dicarboxylic acid having Ar¹ (a divalent aromatic group in formula (I)), and an excess of a diamine having Ar³ (a divalent aromatic group in formula (II)) are reacted in an organic solvent, e.g., N-methyl-2-pyrrolidone, in the presence of a phosphorous ester and a pyridine derivative, etc. in an inert atmosphere, e.g., nitrogen, by heating with stirring to obtain a solution of a phenolic hydroxyl group-containing aramid oligomer having an aminoaryl group at the both terminals thereof. Then, a polybutadiene-acrylonitrile copolymer having a carboxyl group at the both terminals thereof is added to the resulting solution, followed by polycondensation to obtain the block copolymer (I).

Specific but non-limiting examples of the dicarboxylic acids having Ar² include 4-hydroxyisophthalic acid, 5-hydroxyisophthalic acid, 2-hydroxyphthalic acid, and 2-hydroxyterephthalic acid. Specific but non-limiting examples of the dicarboxylic acids having Ar¹ (having no phenolic hydroxyl group) include phthalic acid, isophthalic acid, terephthalic acid, 4,4′-biphenyldicarboxylic acid, 3,3′-methylenedibenzoic acid, 4,4′-methylenedibenzoic acid, 4,4′-hydroxydibenzoic acid, 4,4′-thiodibenzoic acid, 3,3′-carbonyldibenzoic acid, 4,4′-sulfonyldibenzoic acid, 1,4-naphthalenedicarboxylicacid, 1,5-naphthalenedicarboxylic acid, and 2,6-naphthalenedicarboxylic acid. These aromatic dicarboxylic acids may be used either individually or in combinations thereof.

Specific but non-limiting examples of the diamines having Ar³ are m-phenylenediamine, p-phenylenediamine, 3,3′-oxydianiline, 3,4′-oxydianiline, 4,4′-oxydianiline, 3,3′-diaminobenzophenone, bis(4-aminophenyl)sulfone, bis(3-aminophenyl)sulfone, bis(4-aminophenyl)sulfide, 1,4-naphthalenediamine, 2,6-naphthalenediamine, 4,4′-bis(4-phenoxy)diphenylsulfone, 4,4′-bis(3-phenoxy)diphenylsulfone, 2,2′-(4-aminophenyl)propane, bis(4-aminophenyl)methane, o-tolidine, and o-dianisidine. These aromatic diamines may be used either individually or in combinations thereof.

The above-mentioned polybutadiene-acrylonitrile copolymer having a carboxyl group at both terminals thereof is commercially available, for example, under a trade name "Hycar CTBN" sold by BF Goodrich Co., and such a commercially avaiable product may be utilized in the present invention.

The epoxy resin which can be used in the epoxy resin composition of the present invention includes the above-enumerated epoxy resins.

The epoxy resin composition of the invention may further contain the above-mentioned polybutadiene-acrylonitrile copolymer having a carboxyl group at both terminals thereof in an amount usually of from 5 to 50% by weight based on the total epoxy resin. Addition of this copolymer brings about further improved toughness.

While the mechanism of the polybutadiene-acrylonitrile copolymer having a carboxyl group at both terminals thereof in bringing about a further improvement in toughness of the epoxy resin has not yet been elucidated, the following assumption can be made. In addition to the function and effect of the epoxy resin modified material per se, the presence of the epoxy resin modified material makes the dispersion of deposited fine particles of the polybutadiene-acrylonitrile copolymer having a carboxyl group at both terminals thereof more uniform and renders the particle size thereof smaller, whereby the toughness of the epoxy resin further improved.

Specific but non-limiting examples of the hardeners which can be used in the present invention include guanidine derivatives, e.g., dicyandiamide and 1-(o-tolyl)biguanide; aromatic amine compounds, e.g., bis(4-aminophenyl)sulfone, bis(4-aminophenyl)methane, 1,5-diaminonaphthalene, p-phenylenediamine, m-phenylenediamine, o-phenylenediamine, 2,6-dichloro-1,4-benzenediamine, 1,3-di(p-aminophenyl)propane, and m-xylenediamine; aliphatic amine compounds, e.g., ethylenediamine, diethylenetriamine, tetraethylenepentamine, diethylaminopropylamine, hexamethylenediamine, menthenediamine, isophoronediamine, bis(4-amino-3-methyldicyclohexyl)methane, polymethylenediamine, and polyether diamine; polyaminoamide compounds; fatty acid anhydrides, e.g., dodecylsuccinic acid anhydride, polyadipic acid anhydride, and polyazelaic acid anhydride; substituted acid anhydrides, e.g., hexahydrophthalic acid anhydride and methylhexahydrophthalic acid anhydride; aromatic acid anhydrides, e.g., phthalic anhydride, trimellitic anhydride, benzophenonetetracarboxylic acid anhydride, ethylene glycol bistrimellitate, and glycerol tristrimellitate; polyfunctional phenolic compounds, e.g., phenol, cresol, alkylphenols, catechol, bisphenol A, and bisphenol F; high-melting point active hydrogen compounds, e.g., amino resins, urea resins, melamine resins, dihydrazine compounds, polymercaptan compounds, and organic acid dihydrazines; tertiary amines, e.g., amineimide; imidazole salts; salts of Lewis acids or Bronsted acids, e.g., salts of boron trifluoride, monomethylamine, piperidine, trifluoromethanesulfonic acid; and blocked isocyanates.

The hardener is used in an amount usually of from 10 to 200% by weight based on the total epoxy resin.

Toughness of the epoxy resin composition may be further improved by using a bisphenol compound as a part of the hardener in an amount of from 0.1 to 60% by weight based on the total epoxy resin. It appears that a bisphenol compound reacts with the epoxy resin to reduce the reaction density among epoxy resin molecules to thereby enhance the toughness-improving effect of the block copolymer (I). Specific but non-limiting examples of such a bisphenol compound are 2,2'-bis(4-hydroxyphenyl)propane, 2,2'-bis(2-methyl-4-hydroxyphenyl)propane, 2,2'-bis(4-hydroxyphenyl)methane, 1,1'-bis(4-hydroxyphenyl)ethane, 1,1'-bis(4-hydroxyphenyl)hexane, 1,1'-bis(4-hydroxyphenyl)docosyl, 2,2'-bis(4-hydroxyphenyl)butane, 2,2'-bis(4-hydroxyphenyl)hexane, bis(4-hydroxyphenyl)sulfone, bis(3-chloro-4-hydroxyphenyl)sulfone, bis(3,5-dimethyl-4-hydroxyphenyl)sulfone, bis(4-hydroxy-3,5-dibromophenyl)sulfone, bis(4-hydroxyphenyl)sulfide, bis(3-methyl-4-hydroxyphenyl)sulfide, 1,1-bis(4-hydroxyphenyl)cyclohexane, 4,4'-dihydroxybenzophenone, dihydroxynaphthalene, and 1,4-(p-hydroxycumyl)benzene.

If desired, the epoxy resin composition of the present invention may further contain a hardening accelerator. Suitable hardening accelerators include phosphorus compounds, e.g., triphenylphosphine; tertiary amines, e.g., triethanolamine, tetraethylamine, 1,8-diazabicyclo[5,4,0]-7-undecene (DBU), N,N-dimethylbenzylamine, 1,1,3,3-tetramethylguanidine, 2-ethyl-4-methylimidazole, and N-methylpiperazine; and boron compounds, e.g., 1,8-diazabicyclo[5,4,0]-7-undecenium tetraphenylborate.

The epoxy resin composition may furthermore contain other additives, such as parting agents, e.g., natural or synthetic waxes, long-chain fatty acid metal salts, acid amides, esters, and paraffins; stress relaxants, e.g., silicone rubbers, nitrile rubbers, butadiene rubbers, and polysiloxanes; flame retardants, e.g., chlorinated paraffins, bromotoluene, hexabromobenzene, and antimony trioxide; coupling agents, e.g., silane coupling agents, titanate coupling agents, and aluminum coupling agents; inorganic fillers; leveling agents; tackifiers, antistatics; ultraviolet light absorbers; surfactants; electroconductive particles; colorants inclusive of dyes and pigments; antioxidants; photostabilizers; moisture resistance-improving agents; thixotropic agents; diluents; defoaming agents; and other resins.

The terminology "epoxy resin composition" as used herein means both of an unhardened composition and a thermally hardened composition or a molded product obtained therefrom.

While not limiting, hardening of the epoxy resin composition is usually carried out at temperatures of 250° C. or lower for several hours.

The epoxy resin composition according to the present invention is useful for a variety of purposes, for example, in the preparation of powder coatings, organic or inorganic fiber-reinforced composite materials, inorganic filler-reinforced composite materials for sealing of semi-conductor chips, adhesive sheets for airtight sealing of a base having mounted thereon semi-conductor elements, epoxy resin coatings, insulating layers for printed circuit boards, resin compounds for cation electrodeposition, and the like. These applications will be explained below in detail.

An epoxy resin composition for use as a powder coating is obtained by melt kneading an epoxy resin, a hardener, and the epoxy resin modified material of the present invention in an mixing machine, e.g., an extruder, quenching the molten mixture to room temperature, grinding the resulting mass with a general grinding means, e.g., a vibration coupled mill, a jet mill, and a roll mill, followed by classification. The resulting powder preferably has a particle size of not more than 250 μm. If the particle size exceeds 250 μm, a sufficiently smooth coating film can hardly be obtained. The resulting powder coating can be coated by dip coating, fluidization dip coating, spray coating, electrostatic spray coating, electrostatic-fluidized bed coating, vacuum coating, tumble coating, cascade coating, or the like powder coating techniques.

In the fiber-reinforced composite materials using the epoxy resin composition of the invention, the reinforcing fibers include inorganic fibers, e.g., carbon (graphite) fiber, glass fiber, boron fiber, silicon carbide fiber, alumina fiber, and silica alumina fiber; and organic fibers, e.g., aramid fiber and polyester fiber. In particular, advanced fibers such as carbon fiber and aramid fiber are preferred. Carbon fiber may be PAN-based carbon fiber or pitch-based carbon fiber. The reinforcing fibers may be used in combinations of two or more thereof. These fibers may be long fiber or short fiber. Further, the fibers may be subjected to surface treatment. The resin composition may be impregnated into uniaxially arrayed fibers or woven fabric. The fiber-reinforced composite material has a fiber content usually of from 10 to 90% by weight, and preferably from 20 to 80% by weight. While not limiting, the fiber-reinforced composite material is preferably obtained by uniformly dissolving the block copolymer (I) and an epoxy resin in an appropriate solvent, allowing them to react under heating, drying, adding prescribed amounts of a reinforcing fiber, a hardener, etc., and molding the resulting composition by heat hardening. An epoxy resin composition comprising a reaction product between the block copolymer (I) and an epoxy resin, an epoxy resin, a hardener, a hardening accelerator, etc. may be impregnated into woven fabric of reinforcing fiber, followed by heat hardening to obtain a desired molded product. A plurality of the impregnated fabric may be laminated while unhardened or semi-hardened and then hardened by heating.

For use in the inorganic filler-reinforced composite materials for sealing semi-conductor chips, the inorganic fillers to be used include fused silica, crystalline silica, glass flakes, glass beads, glass balloons, talc, alumina, calcium silicate, calcium carbonate, barium sulfate, magnesia, silicon nitride, boron nitride, ferrite, metal powders (e.g., rare earth elements, cobalt, gold, silver, nickel, copper, lead, iron, iron oxide, iron sand), graphite, and carbon. These fillers have a spherical or non-spherical shape and a particle size of from about 0.1 to about 100 μm. The inorganic filler is used in an amount usually of from 10 to 800% by weight, and preferably from 10 to 650% by weight, based on the total epoxy resin.

A hardening epoxy resin composition as a sealing compound can be prepared by reacting the block copolymer (I) and an epoxy resin as dissolved in a solvent by heating, drying the reaction mixture, and mixing the reaction mixture with an epoxy resin, an epoxy resin hardener, an inorganic filler, and other necessary additives, if any. Alternatively, a hardening composition may be prepared by mixing an epoxy resin, a hardener, and the block copolymer all at once by melting or by the use of an appropriate solvent, or by mixing a part of a hardener and the block copolymer and then adding thereto the rest of the necessary components.

Sealing of semi-conductor chips with the thus prepared hardening epoxy resin composition can be performed generally by low-pressure transfer molding. Sealing may also be effected by injection molding, compression molding, infrared hardening, sheet forming, hot roll forming, or heat pressing. The hardening epoxy resin composition is hardened upon heat sealing to provide resin-sealed semi-conductor devices. Heating for hardening is preferably at 150° C. or higher. In order to improve various characteristics of the hardened product, such as heat resistance, it is preferable to post cure the hardened product at temperatures between 150° and 300° C., preferably 170° C. or higher, and more preferably 200° C. or higher, for a period of from 3 to 16 hours.

Adhesive sheets for sealing of semi-conductor elements can be prepared by impregnating an epoxy resin composition of the present invention into, for example, polyester nonwoven fabric. The polyester nonwoven fabric can be prepared either in a wet process or a dry process. A preferred basis weight of the polyester nonwoven fabric, while not limiting, is from 20 to 300 g/m$^2$. Impregnation can be carried out by hot melt impregnation of the epoxy resin composition or by using a varnish prepared by dissolving the epoxy resin composition in an organic solvent. The amount of the epoxy resin composition to be impregnated is usually from 30 to 300 parts by weight, and preferably from 60 to 200 parts by weight, per 100 parts by weight of the polyester nonwoven fabric.

Where the epoxy resin composition of the present invention is used as a coating compound, the coated compound may be dried either by air or by heating. Heat drying is not limited at all and is usually effected at temperatures of 250° C. or lower.

For use in the preparation of an insulating layer of printed circuit boards, a prepreg for a wiring base is prepared by coating or impregnating a varnish prepared by dissolving the block copolymer (I), an epoxy resin, a hardener, etc. in a solvent on or into a base, followed by heat drying. For obtaining strong and tough adhesion, it is preferable to prepare the varnish by first obtaining a reaction product between a part of the epoxy resin and the block copolymer (I) and then dissolving the reaction product in the solvent together with the rest of the epoxy resin and other compounding additives.

An epoxy resin composition for use in cation electrodeposition is used as insolubilized by neutralization with an organic acid, e.g., formic acid, acetic acid, propionic acid, butyric acid, and lactic acid, or an inorganic acid, e.g., phosphoric acid, hydrochloric acid, and sulfuric acid. The amount of the acid to be used should be enough for solubilizing or dispersing the resin in water and is preferably not more than the amino equivalent of the resin. If desired, the composition for cation electrodeposition may further contain an anionic or cationic surface active agent. The thus prepared aqueous solution or dispersion of the epoxy resin composition is uniformly mixed and dispersed by means of a mixing machine or a dispersing machine, e.g., a dissolver, a grinding mill, an attritor, and a roll mill, to obtain a coating compound for cation electrodeposition having a solids content of from about 10 to 30% by weight.

The resulting coating compound is coated by ordinary cathode electrodeposition on, for example, a zinc phosphate-treated steel plate, a phosphoric acid-treated steel plate, a non-treated steel plate, aluminum, a zinc-plated steel plate, and copper, and baked at 120° to 200° C. for 10 to 120 minutes to obtain a baked film excellent in corrosion resistance, impact resistance, adhesion to metals (in Erichsen film test), and appearance.

The present invention is now illustrated in greater detail with reference to. Synthesis Examples, Examples, and Reference Examples, but it should be understood that the present invention is not deemed to be limited thereto. All the parts and percents are by weight unless otherwise specified.

SYNTHESIS EXAMPLE 1

A phenolic hydroxyl group-containing aramid/polybutadiene-acrylonitrile block copolymer containing 2 mol % of a phenolic hydroxyl group in its aramid moiety and 17 mol % of acrylonitrile in its polybutadiene-acrylonitrile moiety was prepared in the following manner.

In 1 l four-necked round flask were charged 19.60 g (118 mmol) of isophthalic acid, 26.4 g (132 mmol) of 3,4'-oxydianiline, 0.41 g (2.3 mmol) of 5-hydroxyisophthalic acid, 3.9 g of lithium chloride, 12.1 g of calcium chloride, 240 ml of N-methyl-2-pyrrolidone, and 54 ml of pyridine. After dissolving the contents by stirring, 74 g of triphenyl phosphite was added to the solution, and the mixture was allowed to react at 90° C. for 4 hours to produce a phenolic hydroxyl group-containing aramid oligomer. To the product was added a solution of 48 g of a polybutadiene-acrylonitrile copolymer having a carboxyl group at both terminals thereof ("Hycar CTBN" produced by BF Goodrich Co.; acrylonitrile content: 17 mol %; molecular weight: about 3600) in 240 ml of pyridine, followed by allowing the mixture to react for 4 hours. After cooling to room temperature, the reaction mixture was poured into 20 l of methanol to precipitate an aramid/polybutadiene-acrylonitrile block copolymer having a polybutadiene-acrylonitrile copolymer content of 50% and a phenolic hydroxyl group content of about 2 mol %. The precipitated polymer was purified by washing with methanol and then refluxing in methanol.

The resulting polymer had an intrinsic viscosity of 0.85 dl/g (dimethylacetamide, 30° C.). The infrared absorption spectrum of the polymer powder by diffuse reflection revealed an absorption assigned to the amidocarbonyl group at 1674 $cm^{-1}$, an absorption assigned to the C-H bond of the butadiene moiety at 2856 to 2975 $cm^{-1}$, and an absorption assigned to the nitrile group at 2245 $cm^{-1}$.

SYNTHESIS EXAMPLE 2

A phenolic hydroxyl group-containing aramid/polybutadiene-acrylonitrile block copolymer containing 14 mol % of a phenolic hydroxyl group in its aramid moiety and 17 mol % of acrylonitrile in its polybutadiene-acrylonitrile moiety was prepared in the same manner as in Synthesis Example 1, except for changing the amounts of the isophthalic acid, 3,4'-oxydianiline, 5-hydroxyisophthalic acid, and carboxyl-terminated polybutadiene-acrylonitrile copolymer to 19.93 g (120 mmol), 30.63 g (153 mmol), 3.64 g (20 mmol), and 55.5 g, respectively.

The resulting polymer had an intrinsic viscosity of 0.82 dl/d. The infrared spectrum of the polymer revealed an absorption assigned to the amidocarbonyl group at 1675 $cm^{-1}$, an absorption assigned to the C-H bond of the butadiene moiety at 2854 to 2971 $cm^{-1}$, and an absorption assigned to the nitrile group at 2243 $cm^{-1}$.

SYNTHESIS EXAMPLE 3

A phenolic hydroxyl group-containing aramid/polybutadiene-acrylonitrile block copolymer containing 14 mol % of a phenolic hydroxyl group in its aramid moiety and 27 mol % of acrylonitrile in its polybutadiene-acrylonitrile moiety was prepared in the same manner as in Synthesis Example 2, except for changing the polybutadiene-acrylonitrile copolymer having a carboxyl group at both terminals thereof and having an acrylonitrile content of 17 mol % to a polybutadiene-acrylonitrile copolymer having a carboxyl group at both terminals thereof and having an acrylonitrile content of 27 mol % (produced by BF Goodrich Co.).

The resulting polymer had an intrinsic viscosity of 0.70 dl/d. The infrared spectrum of the polymer revealed an absorption assigned to the amidocarbonyl group at 1674 $cm^{-1}$, an absorption assigned to the C-H bond of the butadiene moiety at 2854 to 2971 $cm^{-1}$, and an absorption assigned to the nitrile group at 2244 $cm^{-1}$.

EXAMPLE 1

In 200 g of dimethylformamide were dissolved 24 g of the phenolic hydroxyl group-containing aramid/polybutadieneacrylonitrile block copolymer synthesized in Synthesis Example 1 (phenolic hydroxyl group content: 2 mol %), 5.7 g (corresponding to 10 times the hydroxyl equivalent of the block copolymer) of a bisphenol type epoxy resin ("Epikote 828" produced by Yuka Shell; average molecular weight: 380; epoxy equivalent: 190±5), and 0.08 g of triphenylphosphine as a reaction accelerator, and the solution was allowed to react at 90° C. for 2 hours. The reaction mixture was poured into water to precipitate the produced resin, and the precipitate was repeatedly washed with warm water. Tetrahydrofuran was added to the resin, and the solvents were azeotropically removed under reduced pressure. The residue was dried in vacuo to obtain an epoxy resin mixture containing a reaction product of the epoxy resin and the aramid moiety of the block copolymer, i.e., an epoxy resin modified material.

In about 30 ml of pyridine was dissolved 1 mg of this product, and to the solution was added a few drops of an indicator for a phenolic hydroxyl group (a red solution prepared by dissolving 1 g of anhydrous iron (III) chloride in 100 ml of chloroform, adding 8 ml of pyridine to the solution, and removing any precipitate by filtration), followed by stirring. No color change occurred, indicating that all the phenolic hydroxyl groups had undergone reaction with the glycidyl group of the epoxy resin, and no unreacted phenolic hydroxyl group remained in the epoxy resin modified material.

EXAMPLE 2

An epoxy resin modified material-containing epoxy resin mixture was prepared in the same manner as in Example 1, except for replacing the block copolymer of Synthesis Example 1 with 24 g of the block copolymer of Synthesis Example 2 (phenolic hydroxyl group content: 14 mol %) and increasing the bisphenol type epoxy resin to 14.4 g (corresponding to 10 times the hydroxyl equivalent of the block copolymer of Synthesis Example 2).

Presence of any unreacted phenolic hydroxyl group was analyzed in the same manner as in Example 1. As a result, no color change was observed, indicating the absence of an unreacted phenolic hydroxyl group.

EXAMPLE 3

An epoxy resin modified material-containing epoxy resin mixture was prepared in the same manner as in Example 1, except for replacing the bisphenol type epoxy resin with 4.5 g of an o-cresol novolak type epoxy resin ("EOCN-103S" produced by Nippon Kagaku Yakuhin K.K.; average degree of polymerization: 5 to 7; epoxy equivalent: 210 to 230).

As a result of the same analysis on phenolic hydroxyl group as in Example 1, it was confirmed that any unreacted phenolic hydroxyl group was not present in the product.

EXAMPLE 4

An epoxy resin modified material-containing epoxy resin mixture was prepared in the same manner as in Example 1, except for replacing the bisphenol type epoxy resin with 11.5 g of the epoxy resin used in Example 3.

As a result of the same analysis on phenolic hydroxyl group as in Example 1, it was confirmed that any unreacted phenolic hydroxyl group was not present in the product.

EXAMPLE 5

An epoxy resin modified material-containing epoxy resin mixture was prepared in the same manner as in Example 1, except for replacing the bisphenol type epoxy resin with an o-cresol cyclic aliphatic epoxy resin ("CY-179" produced by Ciba-Geigy AG; epoxy equivalent: 131 to 143).

As a result of the same analysis on phenolic hydroxyl group as in Example 1, it was confirmed that any unreacted phenolic hydroxyl group was not present in the product.

EXAMPLE 6

An epoxy resin modified material-containing epoxy resin mixture was prepared in the same manner as in Example 2, except for replacing the bisphenol type epoxy resin with a diglycidyl hexahydrophthalate epoxy resin ("Araldite CY-184" produced by Ciba-Geigy AG; epoxy equivalent: 159 to 182).

As a result of the same analysis on phenolic hydroxyl group as in Example 1, it was confirmed that any unreacted phenolic hydroxyl group was not present in the product.

EXAMPLE 7

An epoxy resin modified material-containing epoxy resin mixture was prepared in the same manner as in Example 2, except for replacing the bisphenol type epoxy resin with a tetraglycidyl aminophenylmethane epoxy resin ("Araldite MY-720" produced by Ciba-Geigy AG; epoxy equivalent: 115 to 135).

As a result of the same analysis on phenolic hydroxyl group as in Example 1, it was confirmed that any unreacted phenolic hydroxyl group was not present in the product.

COMPARATIVE EXAMPLE 1

A comparative epoxy resin composition was prepared by uniformly mixing 100 g of the epoxy resin as used in Example 1, 10 g of tetraethanolamine as a hardening accelerator, and 20.0 g of bis(4-aminophenyl)methane as a hardener by stirring.

EXAMPLE 8

An epoxy resin composition was prepared in the same manner as in Comparative Example 1, except for reducing the epoxy resin to 94 g and further adding 6.3 g of the epoxy resin modified material-containing epoxy resin mixture as prepared in Example 1.

EXAMPLE 9

An epoxy resin composition was prepared in the same manner as in Comparative Example 1, except for reducing the epoxy resin to 92 g and further adding 8 g of the epoxy resin modified material-containing epoxy resin mixture as prepared in Example 2.

COMPARATIVE EXAMPLE 2

A comparative epoxy resin composition was prepared in the same manner as in Comparative Example 1, except for replacing the bisphenol type epoxy resin with an o-cresol novolak type epoxy resin "EOCN-103S" and reducing the hardener, bis(4-aminophenyl)methane, to 22 g.

EXAMPLE 10

An epoxy resin composition was prepared in the same manner as in Comparative Example 2, except for reducing the epoxy resin to 94 g, further adding 6 g of the epoxy resin modified material-containing epoxy resin mixture as prepared in Example 3, and reducing the hardener to 21 g.

EXAMPLE 11

An epoxy resin composition was prepared in the same manner as in Comparative Example 2, except for reducing the epoxy resin to 93 g, further adding 7 g of the epoxy resin modified material-containing epoxy resin mixture as prepared in Example 4, and reducing the hardener to 21 g.

COMPARATIVE EXAMPLE 3

A comparative epoxy resin composition was prepared in the same manner as in Comparative Example 1, except for replacing the epoxy resin with 100 g of an o-cresol cyclic aliphatic epoxy resin "CY-170" produced by Ciba-Geigy AG; epoxy equivalent: 131 to 143) and replacing the hardener, bis(4-aminophenyl)methane, with 56 g of hexahydrophthalic acid anhydride.

EXAMPLE 12

An epoxy resin composition was prepared in the same manner as in Comparative Example 3, except for reducing the epoxy resin to 93.4 g, increasing the hexahydrophthalic acid anhydride to 100 g, and further adding 7 g of the epoxy resin modified material-containing epoxy resin mixture as prepared in Example 5.

COMPARATIVE EXAMPLE 4

A comparative epoxy resin composition was prepared in the same manner as in Comparative Example 1, except for replacing the epoxy resin with 100 g of a diglycidyl hexahydrophthalate epoxy resin "Araldite CY-184" and replacing the hardener with 45 g of hexahydrophthalic acid anhydride.

EXAMPLE 13

An epoxy resin composition was prepared in the same manner as in Comparative Example 4, except for reducing the epoxy resin to 92 g, and further adding 8 g of the epoxy resin modified material-containing epoxy resin mixture as prepared in Example 6.

COMPARATIVE EXAMPLE 5

A comparative epoxy resin composition was prepared in the same manner as in Comparative Example 1, except for replacing the epoxy resin with 100 g of a tetraglycidyl aminophenylmethane epoxy resin "Araldite MY-720" and replacing the hardener with 50 g of 4,4'-diaminodiphenylsulfone.

EXAMPLE 14

An epoxy resin composition was prepared in the same manner as in Comparative Example 5, except for reducing the epoxy resin to 93 g, and further adding 7 g of the epoxy resin modified material-containing epoxy resin mixture as prepared in Example 7.

COMPARATIVE EXAMPLE 6

A comparative epoxy resin composition was prepared in the same manner as in Comparative Example 1, except for reducing the hardener, bis(4-aminophenyl)methane, to 13 g and further adding 15 g of 2,2'-bis(4-hydroxyphenyl)propane as a hardener.

EXAMPLE 15

Six grams of the epoxy resin modified material-containing epoxy resin mixture obtained in Example 1, 94 g of the epoxy resin as used in Example 1, and 14 g of 2,2'-bis(4-aminophenyl)propane as a hardener were mixed, and 19 g of molten bis(4-aminophenyl)propane was further added thereto. The mixture was uniformly mixed with stirring to prepare an epoxy resin composition.

COMPARATIVE EXAMPLE 7

A comparative epoxy resin composition was prepared in the same manner as in Comparative Example 6, except for reducing the hardener, bis(4-aminophenyl)methane, to 13 g and increasing the hardener, 2,2'-bis(4-hydroxyphenyl)propane, to 30 g.

EXAMPLE 16

An epoxy resin composition was prepared in the same manner as in Example 15, except for increasing 2,2'-bis(4-hydroxyphenyl)propane to 22 g and reducing bis(4-aminophenyl)methane to 15 g.

COMPARATIVE EXAMPLE 8

Fifty grams of the epoxy resin as used in Example 1 and 50 g of a polybutadiene-acrylonitrile copolymer having a carboxyl group at both terminals thereof ("Hycar CTBN" produced by BF Goodrich Co.; acrylonitrile content: 27 mol %; molecular weight: about 3400) were mixed at 130° C. for about 2 hours to prepare an epoxy resin solution (polybutadiene-acrylonitrile copolymer content: 50%). Twenty grams of the thus prepared epoxy resin solution, 80 g of the same epoxy resin as used above, and 15.1 g of 1-(o-tolyl)-biguanide as a hardener were mixed with stirring at 60° C. and then hardened by heating at 80° C. for 2 hours and then at 180° C. for 6 hours to obtain a comparative epoxy resin composition (polybutadiene-acrylonitrile copolymer content: 10%).

EXAMPLE 17

An epoxy resin composition was prepared in the same manner as in Comparative Example 8, except for adding 3.6 g of the epoxy resin modified material-containing epoxy resin mixture as obtained in Example 2 to 100 g of the epoxy resin solution as prepared in Comparative Example 8. The resulting composition had a polybutadiene-acrylonitrile copolymer content of 10% and an aramid/polybutadiene-acrylonitrile block copolymer content of 3%.

COMPARATIVE EXAMPLE 9

A comparative epoxy resin composition having a carboxyl-terminated polybutadiene-acrylonitrile copolymer content of 20% was prepared in the same manner as in Comparative Example 8, except for changing the amounts of the epoxy resin solution, epoxy resin, and hardener to 40 g, 40 g, and 1.7 g, respectively.

EXAMPLE 18

An epoxy resin composition was prepared in the same manner as in Comparative Example 9, except that 3.6 g of an epoxy resin modified material-containing epoxy resin mixture which had been prepared in the same manner as in Example 1, except for using the phenolic hydroxyl group-containing aramid/polybutadiene-acrylonitrile block copolymer synthesized in Synthesis Example 3, was added to 100 g of the epoxy resin solution prepared in Comparative Example 9.

Each of the epoxy resin compositions obtained in Comparative Examples 1 to 9 and Examples 8 to 18 was molded and heated at 80° C. for 2 hours and at 180° C. for 6 hours to prepare test specimens. Various physical properties of the specimens were determined according to the following test methods. The results obtained are shown in Table 1 below.

1) Fracture Toughness

Measured with an Instron type tensile tester ("AGS-100A" produced by Shimadzu Corporation) in accordance with ASTM E399-81. Cross head speed: 0.5 mm/min.

2) Impact Strength

Measured with a Dynestat impact testing machine (Dynestat Feinmechaic Ralf Kogel) in accordance with DIN-53453. Specimen size: $15 \times 10 \times 2$ mm.

3) Flexural Strength

Measured with the same tester as used for fracture toughness measurements in accordance with ASTM E399-81.

4) Glass Transition Temperature (Tg)

Calculated from viscoelasticity characteristics measured with a torsion pendulum type visco-elastometer ("RD-100" manufactured by Reska Co.) at a rate of temperature rise of 0.7° C./min. Specimen size: $70 \times 7 \times 0.7$ mm.

TABLE 1

| Example No. | Copolymer Content[*1] (wt %) | OH Content[*2] (mol %) | CTBN Content[*3] (wt %) | Fracture Toughness (kg/cm$^{3/2}$) | Impact Strength (kg/cm) | Flexural Strength (kg/cm$^{3/2}$) | Tg (°C.) |
|---|---|---|---|---|---|---|---|
| Comparative Example 1 | — | — | — | 3.0 | 7.5 | | 180 |
| Example 8 | 5 | 2 | — | 3.2 | 11 | | 184 |
| Example 9 | 5 | 14 | — | 3.2 | 11 | | 199 |
| Comparative Example 2 | — | — | — | 3.0 | | | |
| Example 10 | 5 | 2 | — | 3.7 | | | |
| Example 11 | 5 | 14 | — | 3.9 | | | |

TABLE 1-continued

| Example No. | Copolymer Content*1 (wt %) | OH Content*2 (mol %) | CTBN Content*3 (wt %) | Fracture Toughness (kg/cm$^{3/2}$) | Impact Strength (kg/cm) | Flexural Strength (kg/cm$^{3/2}$) | Tg (°C.) |
|---|---|---|---|---|---|---|---|
| Comparative Example 3 | — | — | — | 3.2 | | | |
| Example 12 | 5 | 14 | — | 4.2 | | | |
| Comparative Example 4 | — | — | — | | 6.7 | | |
| Example 13 | 5 | 14 | — | | 7.4 | | |
| Comparative Example 5 | — | — | — | | | 0.47 | |
| Example 14 | 5 | 14 | — | | | 0.66 | |
| Comparative Example 6 | — | — | — | 2.7 | 11 | | |
| Example 15 | 5 | 2 | — | 4.2 | 12 | | |
| Comparative Example 7 | — | — | — | 2.5 | 8 | | 105 |
| Example 16 | 5 | 2 | — | 3.7 | 19 | | 143 |
| Comparative Example 8 | — | 14 | 10 | | 6.6 | | |
| Example 17 | 3 | 14 | 10 | | 10.4 | | |
| Comparative Example 9 | — | 14 | 30 | | 7.5 | | |
| Example 18 | 3 | 14 | 20 | | 21.0 | | |

Note:
*1Content of phenolic hydroxyl group-containing aramid/polybutadiene-acrylonitrile block copolymer obtained in Synthesis Examples 1, 2 or 3 based on the epoxy resin.
*2Proportion of the hydroxyl groups in the aramid moiety of the phenolic hydroxyl group-containing aramid/polybutadiene-acrylonitrile block copolymer.
*3Polybutadiene-acrylonitrile copolymer having a carboxyl group at both terminals thereof.

In Reference Examples 1 to 3, the epoxy resin composition according to the present invention was evaluated for performance for use as a coating compound.

REFERENCE EXAMPLE 1 (for comparison)

In a mixed solvent of cellosolve acetate and xylene was dissolved 100 g of a bisphenol A type epoxy resin ("AER 667" produced by Asahi Chemical Industry Co., Ltd.; average molecular weight: 2600; epoxy equivalent: 2000) at 130° C., and a resol type phenolic resin ("Hitanol 4010" produced by Hitachi Chemical Co., Ltd.) and a butyl urea resin ("Beckamine P" produced by Dai-Nippon Ink & Chemicals, Inc.) were added thereto as hardening agents to prepare an epoxy resin coating compound. The coating compound was rapidly coated on a 0.2 mm thick tinplate at room temperature with a bar coater to a hardened film thickness of 8 to 10 μm and heated at 80° C. for 2 hours and then at 200° C. for 6 hours for baking and solvent removal to obtain a coating film.

REFERENCE EXAMPLE 2

An epoxy resin coating compound was prepared in the same manner as in Reference Example 1, except for reducing the epoxy resin to 87 g, and further adding 13 g of the epoxy resin modified material-containing epoxy resin mixture obtained in Example 2. A coating film was obtained in the same manner as in Reference Example 1.

REFERENCE EXAMPLE 3

An epoxy resin coating compound was prepared in the same manner as in Reference Example 2, except for reducing the epoxy resin to 74 g, increasing the epoxy resin modified material-containing epoxy resin mixture to 26 g, and further adding 30 g of bisphenol A as a hardening agent. A coating film was obtained in the same manner as in Reference Example 1.

Each of the coating films obtained in Reference Examples 1 to 3 was evaluated according to the following test methods. The results obtained are shown in Table 2 below.

1) Resistance to Bending

A 0.2 mm thick tinplate having the coating film on each side thereof was bent through 180°, and the bend was immersed in a copper sulfate solution. The occurrence of cracking at the bend was observed and rated as follows.

Excellent . . . No cracking occurred.
Good . . . Cracking partly occurred.
Medium . . . Cracking occurred on the entire bend.

2) Adhesion

Adhesion of the coating film was evaluated by peel test in accordance with JIS K6400. Further, adhesion after immersion in 100° C. water for 1 hour was also determined. The results were expressed by the number of 1×1 mm squares remaining on the base per 100 squares.

TABLE 2

| | Reference Example 1 | Reference Example 2 | Reference Example 3 |
|---|---|---|---|
| Adhesion | 100/100 | 100/100 | 100/100 |
| Adhesion after immersion in 100° C. water | 75/100 | 100/100 | 100/100 |
| Bending resistance | poor | excellent to good | excellent |

In Reference Examples 4 and 5, the epoxy resin composition of the present invention was evaluated for performance for use as a powder coating.

REFERENCE EXAMPLE 4 (for comparison)

A hundred grams of a bisphenol type epoxy resin ("Epikote 1004" produced by Yuka Shell; epoxy equivalent: 875 to 975; molecular weight: about 1600), 3 g of dicyandiamide as a hardener, 0.5 g of 2-methylimidazole as a hardening accelerator, 60 g of calcium carbonate, 5 g of red oxide, and 0.5 g of an acrylic levelling agent ("Polyflow S" produced by Kyoeisha Yushi Kogyo) as a flow control agent were mixed under heating at 110° to 130° C., followed by quenching. The resulting mass was ground and sieved to prepare a powder coating having a particle size of under 60 mesh (250 μm). The resulting powder coating was coated on an iron plate (60×60×3.2 mm) preheated at 180° C. to a thickness of about 0.3 mm by fluidization dip coating and then hardened in a hot air circulation type electrical furnace at 180° C. for 60 minutes.

REFERENCE EXAMPLE 5

A powder coating was prepared in the same manner as in Reference Example 4, except for reducing the epoxy resin to 74 g and further adding 26 g of the epoxy resin modified material-containing epoxy resin mixture obtained in Example 2, and a hardened film was formed using the resulting powder coating in the same manner as in Reference Example 4.

The coating films obtained in Reference Examples 4 and 5 were evaluated by visual observation and by measuring a Du Pont impact strength value with a Du Pont impact tester (head: 1/16 in; load: 1 kg). As a result, the coating film of Reference Example 5 had an impact strength of 500 (mm) and a satisfactory appearance. To the contrary, the coating film of Reference Example 4 had an impact strength as low as 250 (m m) and suffered from fine cracks.

In Reference Examples 6 to 7, the epoxy resin composition according to the present invention was evaluated for performance for use in coating formulation for cation electrodeposition.

REFERENCE EXAMPLE 6 (for comparison)

In 40 g of methyl isobutyl ketone was dissolved 100 g of an epoxy resin "Epikote 828", and a mixture of 25 g of diethylamine and 60 g of methyl isobutyl ketone was slowly added thereto at room temperature. After allowing the mixture to stand for a while, the mixture was heated at 100° C. for 1 hour to obtain an amino-modified epoxy resin. To the resulting product was added 75 g of a partial blocked diisocyanate obtained by the reaction between 105 g of tolylene diisocyanate and 45 g of butanol at 60° C. for 1 hour to prepare an amino-modified epoxy resin composition. To 100 g of the resulting composition were added 3.4 g of acetic acid and deionized water to prepare a uniform dispersion having a solids content of 10% and a pH of 5.0. Electrodeposition was conducted using the resulting dispersion as an electrodeposition bath on a zinc phosphate-treated steel plate as a cathode at 25° C. for 3 minutes at 200 V, and the deposit was baked at 180° C. for 30 minutes to form a 25 μm thick hardened film.

REFERENCE EXAMPLE 7

An amino-modified epoxy resin was prepared in the same manner as in Reference Example 6, except for reducing the epoxy resin to 92 g and further adding 8 g of the epoxy resin modified material-containing epoxy resin mixture obtained in Example 2. To the resulting amino-modified epoxy resin were added 75 g of the partial blocked diisocyanate prepared in Reference Example 6 and 10 g of a hexamethoxymethylol melamine resin ("CYMEL 303" produced by Mitsui Toatsu Chemicals, Inc.) to prepare an electrodeposition bath. Electrodeposition was carried out in the same manner as in Reference Example 6 to form a 20 μm thick hardened film.

The electrodeposited and hardened films of Reference Examples 6 and 7 were evaluated according to the following test methods. The results obtained are shown in Table 3 below.

1) Adhesion
 1-1) Measured by peel test. The results were expressed by the number of 1×1 mm squares peeled off the base per 100 squares.
 1-2) Measured by Erichsen film test according to JIS B-7777.

2) Impact Resistance
 Measured in accordance with JIS K-5400.

3) Corrosion Resistance
 Measured by salt spray test in accordance with JIS K-6400. That is, a cut reaching the base was made on the film with a razor blade, and the film was subjected to salt spray exposure. The time required for a rust width to reach 2 run or a peel width to reach 2 mm was measured.

4) Appearance
 The appearance of the film was observed and rated "good" or "poor".

TABLE 3

|  | Reference Example 6 | Reference Example 7 |
|---|---|---|
| Adhesion: | | |
| Peel test | 0/100 | 0/100 |
| Erichsen test (mm) | 5.0 | 6.0 |
| Impact resistance (cm) | 30 | 50 |
| Corrosion resistance (hrs) | 300 | 400 |
| Appearance | poor | good |

REFERENCE EXAMPLE 8 (for comparison) AND REFERENCE EXAMPLES 9 AND 10

The comparative epoxy resin composition prepared in Comparative Example 3 (Reference Example 8) and the epoxy resin compositions prepared in Examples 15 and 16 (Reference Examples 9 and 10, respectively) were evaluated for performance as an impregnating resin composition for the production of fiber-reinforced composite materials.

Carbon fiber ("T 400" produced by Toray Industries, Inc.; 3600 denier; 6000 filaments) was immersed in each epoxy resin composition by a drum winding method. Acetone was removed by evaporation in an oven at 40° to 80° C. to obtain a prepreg. The prepreg was arrayed in one direction to obtain a unidirectional carbon fiber-reinforced resin molded sample of 2 mm in thickness, 12 mm in width, and 120 mm in length having a fiber content of 65% by volume. The sample was heated at 200° C. for 4 hours to harden the resin. A flexural strength in 0° bending of the sample was measured by three-point bending test (span: 64 mm) at 25° C. As a result, the flexural strength of the comparative sample of Reference Example 8 was 170 kgf/mm$^2$, while that of the samples of Reference Examples 9 and 10 was 196 kgf/mm$^2$ and 199 kgf/mm$^2$, respectively, showing an improvement over the comparative sample.

In Reference Examples 11 to 13, the epoxy resin composition according to the present invention was evaluated for performance for use in the production of printed circuit boards.

REFERENCE EXAMPLE 11 (for comparison)

A varnish having a nonvolatile content of 25% was prepared by dissolving in N,N-dimethylacetamide 80 g of a brominated bisphenol A type epoxy resin (epoxy equivalent: 530), 20 g of a phenol novolak type epoxy resin (epoxy equivalent: 200), 4 g of dicyandiamide as a hardener, 2 g of ethylamine hydrochloride, 2 g of γ-glycidoxypropyltrimethoxysilane, and 0.2 g of 1-cyanoethyl-2-phenylimidazole. The varnish was coated on a 180 μm thick, 50 mm wide and 50 mm long Kapton and dried by heating at 130° C. for 10 minutes to prepare a prepreg.

REFERENCE EXAMPLE 12

A prepreg was prepared in the same manner as in Reference Example 11, except for reducing the brominated bisphenol A type epoxy resin to 75 g, replacing the dicyandiamide as a hardener with 30 g of a phenolic-novolak, and further adding 15 g of the epoxy resin modified material-containing epoxy resin mixture prepared in Example 2.

REFERENCE EXAMPLE 13

A prepreg was prepared in the same manner as in Reference Example 12, except for reducing the brominated bisphenol A type epoxy resin to 65 g and increasing the epoxy resin modified material-containing epoxy resin mixture to 30 g.

Three of the prepregs obtained in Reference Example 11, 12, or 13 and a pair of 35 μm thick, 50 mm wide, and 50 mm long copper foil were hot pressed together under conditions of 170° C., 50 kg/cm², and 100 minutes to prepare a copper-clad laminate. The same prepreg was then laminated on each side of the laminate under the same conditions to prepare a three-layered base for circuit boards. The resulting base was tested as follows. The test results are shown in Table 4 below.

1) Peel Strength

A cut was made on the copper foil on the base at a 1 mm width, and the copper foil was peeled at a peel angle of 90° and a pulling speed of 50 mm/min to obtain a peel strength. The same test was repeated after subjecting the sample to heat treatment at 155° C. for 240 hours.

2) Bending Test

The base was bent through 180° C., and the bend was observed to see whether or not cracking occurred.

TABLE 4

| | Reference Example 11 | Reference Example 12 | Reference Example 13 |
|---|---|---|---|
| Peel Strength (kgf/cm): | | | |
| At room temp. | 1.8 | 1.9 | 1.9 |
| 155° C. × 240 hrs. | 1.1 | 1.8 | 1.7 |
| Crack on Bending | observed | not observed | not observed |

In Reference Examples 14 and 15, the epoxy resin composition according to the present invention was evaluated for performance for use in adhesive sheets.

REFERENCE EXAMPLE 14 (for comparison)

In methyl ethyl ketone were dissolved 100 g of an o-cresol novolak type epoxy resin ("Sumiepoxy ESCN-220HH" produced by Sumitomo Chemical Co., Ltd.; epoxy equivalent: 205 g/eq.; softening point: 80° C.), 10 g of 4,4'-diaminophenylsulfone as a hardener, and 2 g of a coupling agent ("KEM-403" produced by Shin-Etsu Chemical Industry Co., Ltd.) to prepare an about 50% impregnating resin solution. The solution was impregnated into polyester nonwoven fabric (basis weight: 40 g/m²; thickness: 0.12 mm; fiber thickness: 1 to 2 denier) and dried in a hot air drier at 110° C. for 20 minutes to obtain an adhesive sheet having the epoxy resin composition content of 70%. Thermal hardening of the epoxy resin composition was conducted at 100° C. for 4 hours and then at 180° C. for 6 hours.

REFERENCE EXAMPLE 15

An adhesive sheet was obtained in the same manner as in Reference Example 14, except for reducing the epoxy resin to 74 g, reducing the hardener to 9.2 g, and further adding 26 g of the epoxy resin modified material-containing epoxy resin mixture prepared in Example 2.

Each of the adhesive sheets prepared in Reference Examples 14 and 15 was evaluated as follows.

1) Punching Quality

The adhesive sheet was cut to 50 mm wide tape. The tape was cut 100 times with a force-cutting blade at 5 mm intervals, and dusting during the cutting was examined.

2) Anti-Blocking

Five sheets (50 mm × 50 mm) cut out of the adhesive sheet were laid upon each other and allowed to stand under a load of 1 kg in a thermostat set at 30° C. for 12 hours. Blocking among the sheets was examined.

3) Sealing Properties

A frame having an outer size of 40×40 mm and an inner size of 35×35 mm was cut out of the adhesive sheet. A pair of overcoat glass-treated aluminum plates of 1 mm in thickness, 50 mm in length, and 50 mm in width were adhered with the frame therebetween and fixed by a clip. The sealing frame was hardened by heating at 100° C. for 4 hours and then at 180° C. for 6 hours to prepare a sample. The sample was allowed to stand in a thermoset at 85° C. and 85% RH for 1000 hours, and peeling was examined.

As a result of the tests, the sample of Reference Example 15 exhibited very satisfactory characteristics, whereas that of Reference Example 14 turned out to withstand no use.

While the invention has been described in detail and with reference to specific examples thereof, it will be apparent to one skilled in the art that various changes and modifications can be made therein without departing from the spirit and scope thereof.

What is claimed is:

1. An epoxy resin modified material obtained by reacting an epoxy resin and a phenolic hydroxyl group-containing aramid/polybutadiene-acrylonitrile block copolymer represented by formula (I):

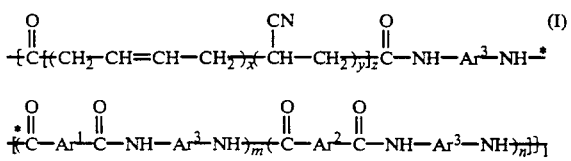

wherein $Ar^1$ and $Ar^3$ each represent a divalent aromatic group; $Ar^2$ represents a phenolic hydroxyl group-containing divalent aromatic group; x represents an integer of from 3 to 7; y represents an integer of from 1 to 4; y/(x+y) is from 0.1 to 0.3; z represents an integer of from 5 to 15; m represents an integer of from 1 to 400; n represents an integer of from 1 to 400 n/(m+n) is from 0.01 to 0.50; and l represents an integer of from 1 to 50.

2. An epoxy resin modified material as in claim 1, wherein said epoxy resin is a bisphenol epoxy resin represented by formula (II):

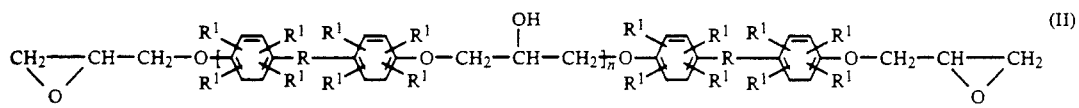

wherein R represents —C(CH$_3$)$_2$—, —CH(CH$_3$)—, —CH$_2$—, or —SO$_2$—; R$^1$ represents a hydrogen atom, a bromine atom, or a methyl group; and n is an integer of from 0 to 70.

3. An epoxy resin modified material as in claim 1, wherein said epoxy resin is a novolak epoxy resin represented by formula (III):

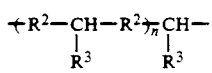 (III)

wherein R$^2$ represents a group of formula (IV):

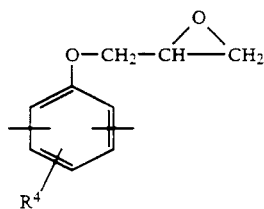 (IV)

or a group of formula (V):

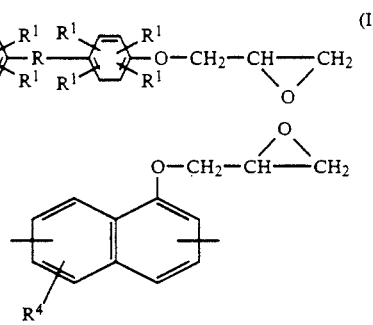 (V)

wherein R$^4$ represents a hydrogen atom, a bromine atom, or a methyl group; R$^3$ represents —(CH$_2$)$_3$CH$_3$, —CH$_2$CH(CH$_3$)$_2$, —C(CH$_3$)$_2$CH$_2$CH$_3$, —CH=CH$_2$, —C$_6$H$_6$, or a hydrogen atom; and n is an integer of from 1 to 40.

4. An epoxy resin modified material as in claim 1, wherein said epoxy resin is a cyclic aliphatic epoxy resin.

5. An epoxy resin modified material as in claim 1, wherein said epoxy resin is a glycidylamine-based epoxy resin.

6. An epoxy resin modified material as in claim 1, wherein said epoxy resin is a glycidyl ester-based epoxy resin.

* * * * *